United States Patent
Adachi

(10) Patent No.: US 7,709,803 B2
(45) Date of Patent: May 4, 2010

(54) LIGHT OR RADIATION DETECTING UNIT MANUFACTURING METHOD, AND A LIGHT OR RADIATION DETECTING UNIT MANUFACTURED BY THIS METHOD

(75) Inventor: Susumu Adachi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 483 days.

(21) Appl. No.: 11/511,344

(22) Filed: Aug. 29, 2006

(65) Prior Publication Data

US 2007/0045553 A1 Mar. 1, 2007

(30) Foreign Application Priority Data

Aug. 31, 2005 (JP) .............................. 2005-250896

(51) Int. Cl.
*G01T 1/24* (2006.01)
(52) U.S. Cl. ........................... 250/370.09; 250/370.12; 438/149; 438/780
(58) Field of Classification Search ............ 250/370.09, 250/208.1, 214 R, 370.18, 370.12; 438/149, 438/780
See application file for complete search history.

(56) References Cited

U.S. PATENT DOCUMENTS

| | | | | |
|---|---|---|---|---|
| 4,535,468 | A * | 8/1985 | Kempter | 378/31 |
| 5,776,803 | A * | 7/1998 | Young | 438/149 |
| 6,407,374 | B1 * | 6/2002 | Sato et al. | 250/208.1 |
| 6,512,233 | B1 * | 1/2003 | Sato et al. | 250/370.13 |
| 6,864,484 | B1 * | 3/2005 | Zur | 250/370.09 |
| 6,974,971 | B2 * | 12/2005 | Young | 257/72 |
| 7,105,462 | B2 * | 9/2006 | Malajovich | 438/780 |
| 7,259,106 | B2 * | 8/2007 | Jain | 438/737 |
| 2001/0025938 | A1 * | 10/2001 | Imai | 250/591 |
| 2002/0181659 | A1 * | 12/2002 | Watanabe et al. | 378/189 |
| 2003/0010923 | A1 * | 1/2003 | Zur | 250/370.09 |
| 2003/0155517 | A1 * | 8/2003 | Numai et al. | 250/370.09 |
| 2003/0194617 | A1 * | 10/2003 | Kobayashi | 430/5 |
| 2004/0195515 | A1 * | 10/2004 | Wheeler et al. | 250/370.12 |
| 2004/0227097 | A1 * | 11/2004 | Brabec et al. | 250/370.12 |
| 2004/0266165 | A1 * | 12/2004 | Utsunomiya | 438/616 |

FOREIGN PATENT DOCUMENTS

JP 2002-082172 3/2002

OTHER PUBLICATIONS

W. Zhao, et al., "A flat panel detector for digital radiology using active matrix readout of amorphous selenium", Proc. SPIE vol. 2708, pp. 523-531, 1996.
S. Adachi, et al., "Experimental Evaluation of a -Se and CdTe Flat-Panel X-ray Detector for Digital Radiology and Fluoroscopy", Proc. SPIE vol. 3977, pp. 38-47, 2000.
""Organic Transistors and Printable Integrated Circuits"—Nanoelectronics", [online], Internet <URL: http//www.nanoelectronics.jp/kaitai/printableofet/2.htm> and its English translation.

* cited by examiner

*Primary Examiner*—David P Porta
*Assistant Examiner*—Djura Malevic
(74) *Attorney, Agent, or Firm*—Cheng Law Group, PLLC

(57) ABSTRACT

At least part of a readout pattern including carrier collecting electrodes, capacitors, thin-film transistors, data lines and gate lines is formed by vapor deposition or printing. This is formed separately from a semiconductor thick film. The semiconductor thick film and readout pattern constitute a flat panel X-ray detector (FPD) is mounted in a case to form a unit. A weight reduction is achieved by using the semiconductor thick film in place of a conventional glass substrate. The FPD manufactured in this way is free from great restrictions in time of transport and use.

12 Claims, 9 Drawing Sheets

X rays

X rays

LIGHT OR RADIATION DETECTING UNIT MANUFACTURING METHOD, AND A LIGHT OR RADIATION DETECTING UNIT MANUFACTURED BY THIS METHOD

BACKGROUND OF THE INVENTION (1) Field of the Invention

This invention relates to a light or radiation detecting unit manufacturing method, and a light or radiation detecting unit manufactured by this method, for use in the medical field, industrial field, nuclear field and so on.

(2) Description of the Related Art

An imaging apparatus that obtains images based on detected light or radiation has a light or radiation detector for detecting light or radiation. Such a detector will be described, taking an X-ray detector for example. An X-ray detector has an X-ray converting layer (semiconductor layer) of the X-ray sensitive type. The X-ray converting layer converts incident X-rays into carriers (charge information). The detector detects the X-rays by reading the carriers. Amorphous selenium (a-Se) film, for example, is used as the X-ray converting layer (W. Zhao, et al., "A flat panel detector for digital radiology using active matrix readout of amorphous selenium", Proc. SPIE Vol. 2708, pp. 523-531, 1996).

In a radiographic operation carried out by irradiating an object under examination with X-rays, radiographic images transmitted through the object under examination are projected onto the amorphous selenium film, thereby generating carriers proportional to the densities of the images in the film. The carriers generated in the film are collected by carrier collecting electrodes in a two-dimensional arrangement. After the collection is continued for a predetermined time (called "accumulation time"), the carriers are read outside via thin-film transistors.

For manufacturing such an X-ray detector, amorphous selenium film is formed by vapor deposition on a glass substrate (insulating substrate) having a pattern formation of switching elements consisting of thin-film transistors and the above carrier collecting electrodes arranged two-dimensionally (S. Adachi, et al., "Experimental Evaluation of a-Se and CdTe Flat-Panel X-ray Detector for Digital Radiology and Fluoroscopy", Proc. SPIE Vol. 3977, pp. 38-47, 2000).

A technique has been proposed for forming a pattern of thin-film transistors on a glass substrate by vapor deposition or printing (ink jet method, or a kind of stamping or coating method) of organic molecules (""Organic Transistors and Printable Integrated Circuits"—Nanoelectronics", [online], Internet <URL: http://www.nanoelectronics.jp/kaitai/printableofet/2.htm>). Organic low molecules, typically single crystals such as pentacene and naphthacene, among organic molecules are suited for formation by vapor deposition. Organic polymers are suited for formation by printing method.

Such an X-ray detector has peripheral circuits such as an amplifier array circuit for amplifying the carriers detected by the detector, and an analog-to-digital converter for converting the amplified carriers from analog values to digital values. These components are contained in a case (storage container) in order to combine them into a unit as disclosed in Japanese Patent No. 3577003. An X-ray detecting unit formed in this way serves as a portable type capable of being carried about conveniently.

The gross weight of the portable detecting unit should be 4 to 5 kg or less to meet the condition that the unit can be carried in one hand. However, as noted above, the conventional construction has thin-film transistors formed as a pattern on a glass substrate. Therefore, to realize a size for imaging the human chest (e.g. a size 43 cm×43 cm), for example, the weight of the glass substrate alone would account for about 1 kg.

A large glass substrate breaks very easily, and scrupulous care must be taken not to apply a shock in time of transport and use. This imposes great restrictions, for example, when the detecting unit is used outdoors such as at a disaster site, or when the detecting unit is carried and used in a medical checkup vehicle.

SUMMARY OF THE INVENTION

This invention has been made having regard to the state of the art noted above, and its object is to provide a radiation detecting unit manufacturing method, and a radiation detecting unit manufactured by this method, which unit is lightweight, and is free from great restrictions in time of transport and use.

To fulfill the above object, inventor has made intensive research and attained the following findings.

The research has explored for an alternative material for the substrate which has been the cause of the heavy weight and has imposed great restrictions in time of transport and use. A conversion layer, typically a semiconductor layer, may be used in place of the substrate in ""Organic Transistors and Printable Integrated Circuits"—Nanoelectronics" noted above. Then, it is possible to construct an X-ray detector with the pattern formed by vapor deposition or printing (ink jet method, or a kind of stamping or coating method) and the conversion layer. When the detector is stored in a case, the weight will be reduced by an amount corresponding to the difference between the substrate and the conversion layer. The resulting X-ray detecting unit will be lightweight and free from great restrictions in time of transport and use.

Based on the above findings, this invention provides a method of manufacturing a light or radiation detecting unit including a light or radiation detector having a conversion layer for receiving light or radiation and converting information on the light or radiation into charge information, and a readout pattern for reading the charge information, the light or radiation detector detecting the light or radiation by reading the charge information with the readout pattern, and being mounted in a storage container to form a unit, the method comprising a readout pattern forming step for forming at least part of the readout pattern by vapor deposition or printing; and wherein the readout pattern is formed in the readout pattern forming step separately from the conversion layer.

With the method of manufacturing a light or radiation detecting unit according to this invention, a readout pattern forming step is executed to form at least part of the readout pattern by vapor deposition or printing. The readout pattern is formed in the readout pattern forming step separately from the conversion layer. A light or radiation detector having the conversion layer and the readout pattern is contained in a storage container to form a unit. The weight is reduced by using this conversion layer. The light or radiation detecting unit manufactured in this way is free from great restrictions in time of transport and use.

In one example of the method of manufacturing a light or radiation detecting unit, the readout pattern forming step is executed to form at least part of the readout pattern by vapor deposition or printing on a thin film sheet, the method further comprising a pasting step for pasting the readout pattern formed on the thin film sheet and the conversion layer. This example realizes a detecting unit having the thin film sheet between the readout pattern and conversion layer.

In another example of the method of manufacturing a light or radiation detecting unit, the conversion layer includes a first conversion layer for converting information on incident radiation to information on the light, and a second conversion layer for converting the information of the light to the charge information, the detector detecting the radiation with the first conversion layer and the second conversion layer. In this example, the first conversion layer converts information on incident radiation to information on the light, and the second conversion layer converts the information of the light to the charge information. Thus, the detector detects the radiation, with the first conversion layer and second conversion layer converting information on the radiation indirectly to the charge information. This detector is a radiation detector called the "indirect conversion type".

With this radiation detector of the "indirect conversion type", the readout pattern forming step may be executed to form at least part of the readout pattern along with the second conversion layer by vapor deposition or printing on a thin film sheet; the method further comprising a pasting step for pasting the readout pattern formed along with the second conversion layer on the thin film sheet and the first conversion layer. This example realizes a detecting unit having the thin film sheet between the readout pattern and the first conversion layer.

In the above methods of manufacturing a light or radiation detecting unit, the readout pattern forming step, preferably, is executed to form at least part of the readout pattern with an organic thin film. When at least part of the readout pattern is formed of an organic thin film, organic low molecules, typically single crystals such as pentacene and naphthacene are suited for forming the readout pattern by vapor deposition. Organic polymers are suited for forming the readout pattern by printing (ink jet method, or a kind of stamping or coating method).

That is, when an organic low molecule is selected for the readout pattern, the readout pattern is laminated by vapor deposition. When an organic polymer is selected for the readout pattern, the readout pattern is laminated by printing (ink jet method, or a kind of stamping or coating method).

Also when at least part of the readout pattern is formed of inorganic thin film or metal instead of organic thin film, the laminating formation can be performed by printing. For example, a noble metal may be reduced to particles of nano size for laminating wiring of the readout pattern by printing.

In the above method of manufacturing a light or radiation detecting unit, the readout pattern may be laminated on a reverse surface to a radiation incidence surface of the conversion layer, or may be laminated on the radiation incidence surface of the conversion layer.

In the above method of manufacturing a light or radiation detecting unit, the storage container, preferably, is formed of a resin; the method further comprising a shield processing step for performing an electric or magnetic shield process of the resin. The shield processing step can prevent mixing of noise due to electricity or magnetism.

Preferably, the storage container has an incidence surface formed thinner than other surfaces thereof. This is effective to prevent the radiation being attenuated by the storage container.

A light or radiation detecting unit according to this invention is manufactured by the method of manufacturing a light or radiation detecting unit described above, the detecting unit comprising a conversion layer for receiving light or radiation and converting information on the light or radiation into charge information; a readout pattern for reading the charge information; and a storage container for storing, as a unit, a light or radiation detector detecting the light or radiation by reading the charge information with the readout pattern.

With the light or radiation detecting unit according to this invention, the readout pattern forming step is executed to form at least part of the readout pattern by vapor deposition or printing, separately from the conversion layer. The light or radiation detector having the conversion layer and the readout pattern is contained in a storage container to form a unit. The weight of the radiation detector is reduced by using this conversion layer. The detector manufactured in this way is free from great restrictions in time of transport and use.

One example of the light or radiation detecting unit further comprises an amplifying device for amplifying the charge information detected by the detector; and an analog-to-digital converting device for converting the amplified charge information from analog values to digital values; wherein the storage container stores the amplifying device and the analog-to-digital converting device. The storage container stores the amplifying device for amplifying the charge information detected by the detector, and the analog-to-digital converting device for converting the amplified charge information from analog values to digital values. Thus, the detector is formed into a unit along with the amplifying device and analog-to-digital converting device.

Where the container stores the amplifying device and analog-to-digital converting device, the detecting unit, preferably, further comprises a storage battery charged once in order to supply power to the amplifying device and the analog-to-digital converting device, wherein the storage container stores the storage battery. With the storage container storing the storage battery along with the amplifying device and analog-to-digital converting device, there is no need for a power cable electrically connected to the detecting unit in order to supply power.

Where the container stores the amplifying device and analog-to-digital converting device, the detecting unit, preferably, further comprises a storage battery charged once in order to supply power to the amplifying device and the analog-to-digital converting device, the storage battery being detachably attached to the storage container. With the storage battery detachably attached to the storage container, a selection may be made as appropriate between a detecting unit with the storage battery and a detecting unit without the storage battery.

One example of the storage battery stored in the storage container or detachably attached to the storage container is a fuel cell. The fuel has an extended service life.

One example of the above light or radiation detecting unit further comprises a storage medium for storing data resulting from detection, wherein the storage container stores the storage medium. With the storage container storing the storage medium, the detector is formed into a unit along with the storage medium.

In the above light or radiation detecting unit, the storage container, preferably, is formed of a resin having undergone an electric or magnetic shield process. Such a resin can prevent mixing of noise due to electricity or magnetism.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Preferred embodiments of this invention will be described in detail hereinafter with reference to the drawings.

First Embodiment

Figure 1:
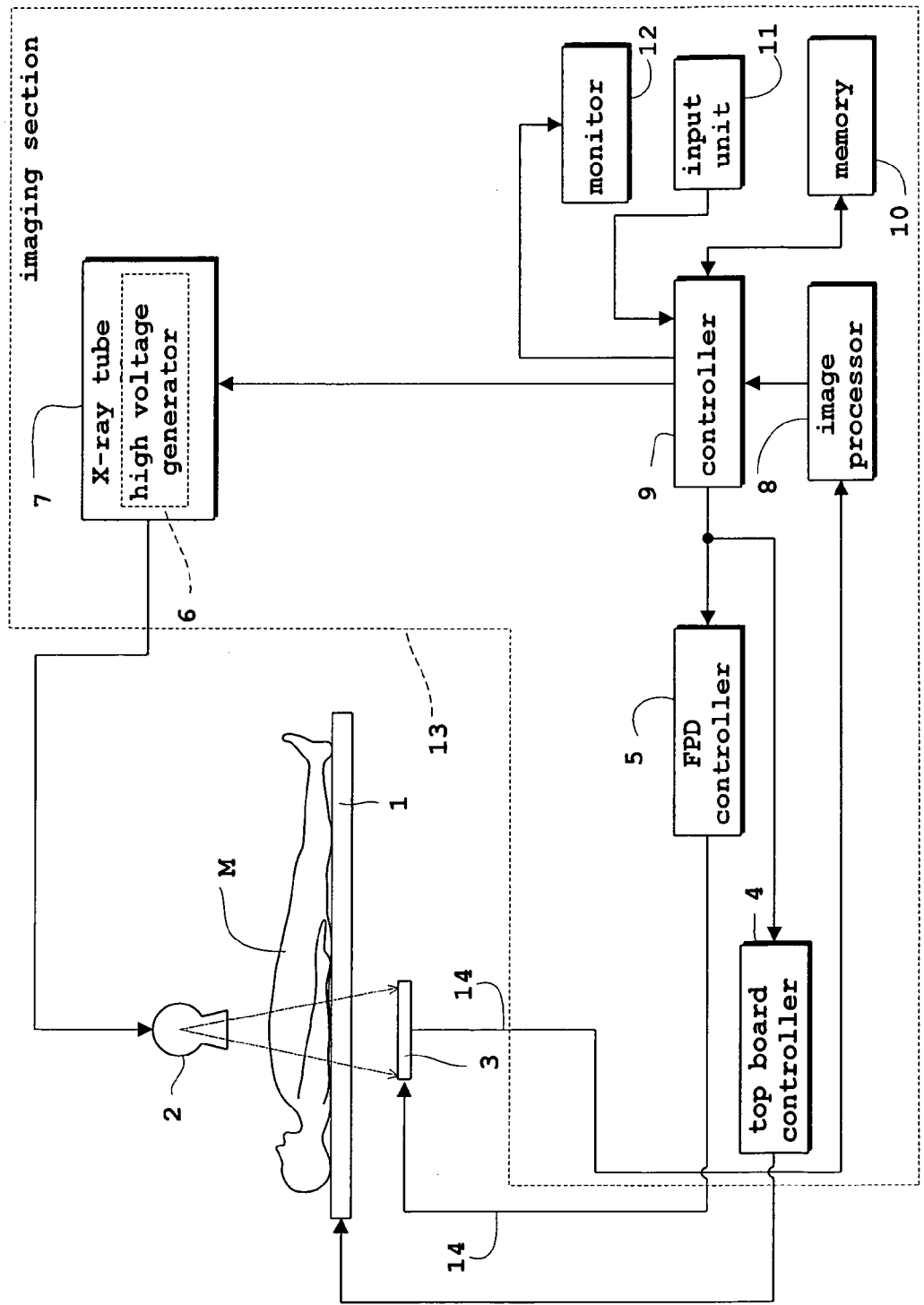
FIG. 1 is a block diagram of an X-ray fluoroscopic apparatus according to this invention.
Figure 2:
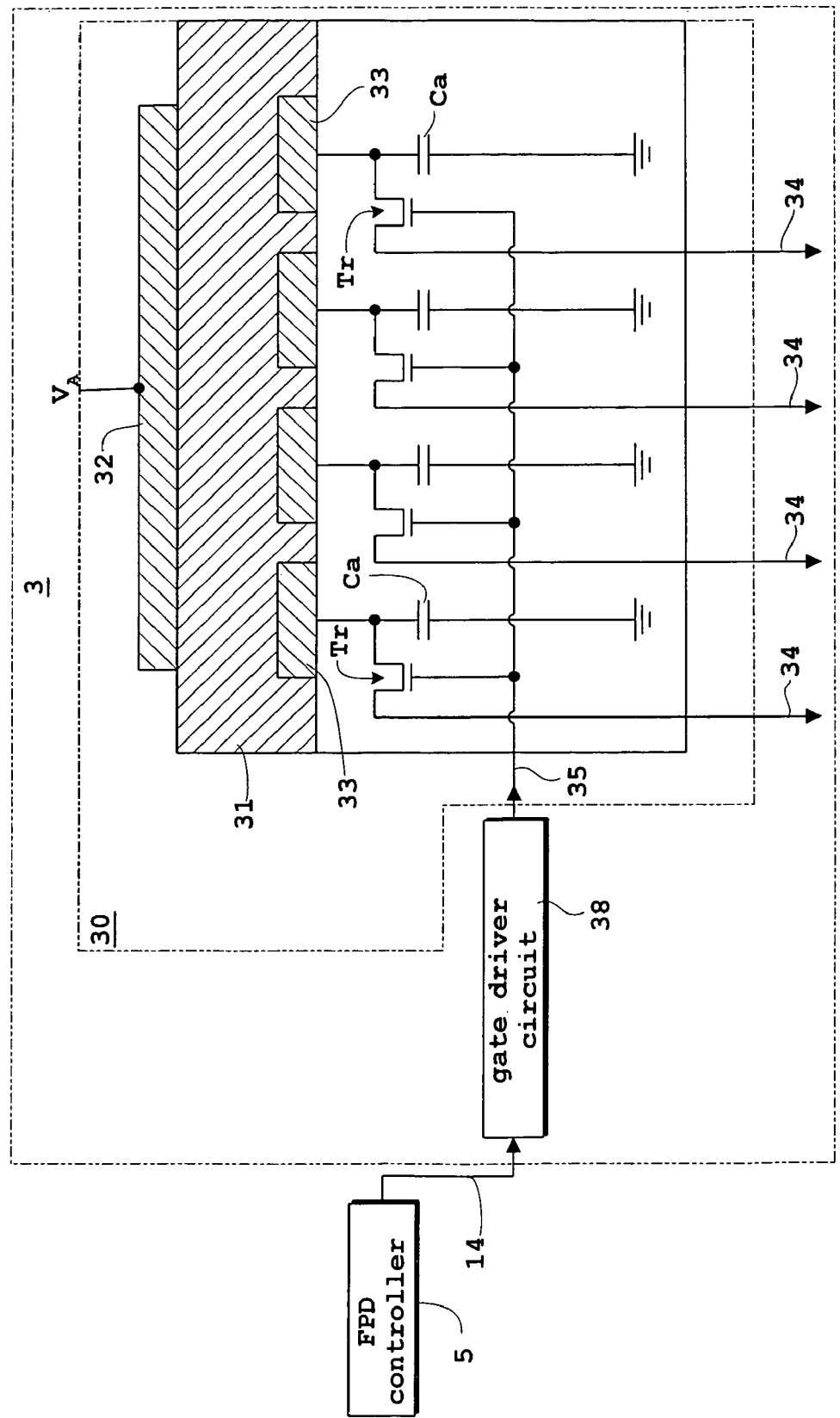
FIG. 2 is an equivalent circuit, seen in side view, of a flat panel X-ray detector used in the X-ray fluoroscopic apparatus.
Figure 3:
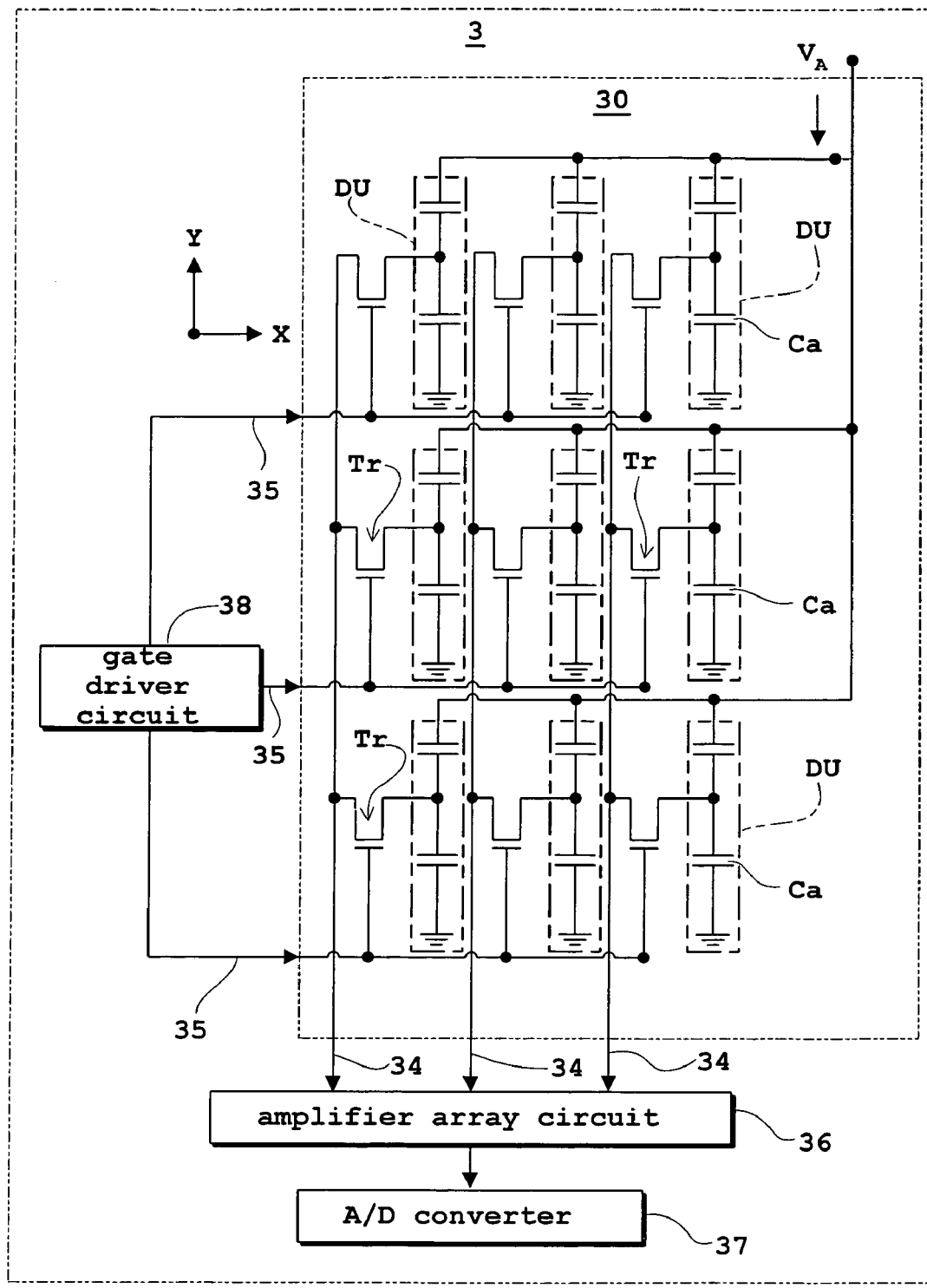
FIG. 3 is an equivalent circuit, seen in plan view, of the flat panel X-ray detector.

FIG. 1 is a block diagram of an X-ray fluoroscopic apparatus according to this invention. FIG. 2 is an equivalent circuit, seen in side view, of a flat panel X-ray detector used in the X-ray fluoroscopic apparatus. FIG. 3 is an equivalent circuit, seen in plan view, of the flat panel X-ray detector. This embodiment will be described, taking the flat panel X-ray detector (hereinafter called "FPD" as appropriate) as an example of light or radiation detecting device, and the fluoroscopic apparatus as an example of imaging apparatus.

As shown in FIG. 1, the fluoroscopic apparatus in the first embodiment, and also in the second to fourth embodiments, includes a top board 1 for supporting a patient M, an X-ray tube 2 for emitting X-rays toward the patient M, and an FPD unit 3 for detecting X-rays transmitted through the patient M. The FPD unit 3 corresponds to the radiation detecting unit in this invention.

The fluoroscopic apparatus further includes a top board controller 4 for controlling vertical and horizontal movements of the top board 1, an FPD controller 5 for controlling scanning action of an FPD 30 of the FPD unit 3 described hereinafter, an X-ray tube controller 7 having a high voltage generator 6 for generating a tube voltage and tube current for the X-ray tube 2, an image processor 8 for performing various processes based on X-ray detection signals outputted from an analog-to-digital converter 37 of the FPD unit 3 described hereinafter, a controller 9 for performing an overall control of these components, a memory 10 for storing processed images, an input unit 11 for the operator to input various settings, and a monitor 12 for displaying the processed images and other information.

The top board controller 4, FPD controller 5, X-ray tube controller 7 with the voltage generator 6, image processor 8, controller 9, memory 10, input unit 11 and monitor 12 constitute an imaging section 13. The FPD unit 3 and imaging section 13 are electrically connected to each other through electric cables 14 extending therebetween. These electric cables 14, typically, are in the form of USB cables which are a general-purpose interface for personal computers. Where data transfer is performed with the exteriors, as between the FPD unit 3 and imaging section 13, the connection is not limited to cables like the electric cables 14, but may be wireless data transmission. Alternatively, off-line transmission may be employed in which data is stored in a storage medium, typically a memory card, and the FPD unit 3 or imaging section 13 reads the data from the storage medium.

The top board controller 4 controls movements of the top board 1, such as moving the top board 1 horizontally to place the patient M in an imaging position, vertically moving and/or rotating the top board 1 to set the patient M to a desired position, horizontally moving the top board 1 during an imaging operation, and horizontally moving the top board 1 to withdraw the patient M from the imaging position after the imaging operation. The FPD controller 5 controls scanning action by moving the FPD unit 3, including the FPD 30 described hereinafter, horizontally or revolving the FPD unit 3 about the body axis of patient M. The high voltage generator 6 generates the tube voltage and tube current for the X-ray tube 2 to emit X-rays. The X-ray tube controller 7 controls scanning action by moving the X-ray tube 2 horizontally or revolving the X-ray tube 2 about the body axis of patient M, and controls setting of a coverage of a collimator (not shown) disposed adjacent the X-ray tube 2. In time of scanning action, the X-ray tube 2 and FPD unit 3 including the FPD 30 are moved while maintaining a mutually opposed relationship, so that the FPD 30 may detect X-rays emitted from the X-ray tube 2.

The controller 9 has a central processing unit (CPU) and other elements. The memory 10 has storage media, typically a ROM (Read-Only Memory) and a RAM (Random Access Memory). The input unit 11 has a pointing device, typically a mouse, keyboard, joy stick, trackball and/or touch panel. The fluoroscopic apparatus creates images of the patient M, with the FPD 30 detecting X-rays transmitted through the patient M, and the image processor 8 performing an image processing based on the X-rays detected.

The FPD unit 3 includes the FPD 30. As shown in FIG. 2, the FPD 30 includes a radiation sensitive semiconductor thick film 31 for generating carriers in response to incident radiation such as X-rays, a voltage application electrode 32 formed on the surface of the semiconductor thick film 31, carrier collecting electrodes 33 arranged on the back surface remote from the radiation incidence side of the semiconductor thick film 31, capacitors Ca for storing charges corresponding to the carriers collected by the carrier collecting electrodes 33, and thin film transistors (TFT) Tr acting as switching elements, normally turned off, for transferring the charges from the capacitors Ca. In the first embodiment, the semiconductor thick film 31 is formed of a radiation sensitive material which generates carriers in response to incident radiation, such as amorphous selenium. The semiconductor thick film 31 may be formed of a light sensitive material for generating carriers in response to incident light. The semiconductor thick film 31 corresponds to the conversion layer in this invention.

In addition to the above components, the FPD 3 in the first embodiment, and also in the second to fourth embodiments, has data lines 34 connected to the sources of the thin film transistors Tr, and gate lines 35 connected to the gates of the thin film transistors Tr. The voltage application electrode 32, semiconductor thick film 31, carrier collecting electrodes 33, capacitors Ca, thin film transistors Tr, data lines 34 and gate lines 35 are laminated together. The carrier collecting electrodes 33, capacitors Ca, thin-film transistors Tr, data lines 34 and gate lines 35 constitute the readout pattern in this invention.

As shown in FIGS. 2 and 3, the capacitors Ca and thin film transistors Tr are connected, respectively, to the numerous (e.g. 1,024×1,024 or 4,096×4,096) carrier collecting electrodes 33 arranged in a two-dimensional matrix of rows and columns. Each set of carrier collecting electrode 33, capacitor Ca and thin film transistor Tr acts as a separate detecting element DU. The voltage application electrode 32 is formed over the entire surface as a common electrode of all the detecting elements DU. As shown in FIG. 3, the data lines 34 form a plurality of columns juxtaposed in the horizontal (X) direction, while the gate lines 35 form a plurality of rows juxtaposed in the vertical (Y) direction. Each data line 34 and each gate line 35 are connected to the detecting elements DU. The data lines 34 are connected to an amplifier array circuit 36. The amplifier array circuit 36 is connected to the analog-to-digital converter 37. The gate lines 35 are connected to a gate driver circuit 38. The number of detecting elements DU is not limited to 1,024×1,024 or 4,096×4,096, but is variable according to forms of implementation. Thus, only one detecting element DU may be provided. The amplifier array circuit 36 corresponds to the amplifying device in this invention. The analog-to-digital converter 37 corresponds to the analog-to-digital converting device in this invention.

Operation of the X-ray fluoroscopic apparatus and flat panel X-ray detector (FPD) in the first embodiment will be described next. Radiation to be detected is emitted to the FPD 3 in the state of a high bias voltage $V_A$ (e.g. several hundred volts to several tens of kilovolts) being applied to the voltage application electrode 32. This bias voltage $V_A$ is applied also under control of the FPD controller 5.

Carriers are generated by incidence of the radiation, and are stored as charge information in the capacitors Ca for charge accumulation. A gate line 35 is selected by a signal-fetching scan signal (i.e. gate driving signal) to the gate driver circuit 38. As a result, the detecting elements DU connected to this gate line 35 are designated. The charges stored in the capacitors Ca of the designated detecting elements DU are outputted to the data lines 34 via the thin film transistors Tr turned on by the signal on the selected gate line 35.

The address of each detecting element DU is designated based on the signal fetching scan signals on the data line 34 and gate line 35 (i.e. the gate driving signal on the gate line 35 and amplifier driving signal on the data line 34). When a signal fetching scan signal is inputted to the gate driver circuit 38, each detecting element DU is selected by a scan signal (gate driving signal) of the vertical (Y) direction outputted from the gate driver circuit 38. Then, the amplifier array circuit 36 is switched by a scan signal of the horizontal (X) direction (amplifier driving signal), whereby the charges from the capacitor Ca of a selected detecting element DU is outputted to the amplifier array circuit 36 through the data line 34. The charges are amplified by the amplifier array circuit 36, and outputted as X-ray detection signals from the amplifier array circuit 36 to the analog-to-digital converter 37. The analog-to-digital converter 37 digitizes and outputs the X-ray detection signals which are charge signals from the FPD 30.

Where the FPD 30 in the first embodiment is used in the fluoroscopic apparatus for detecting an X-ray fluoroscopic image, for example, the above operation converts the charge information (X-ray detection signals) read through the data lines 34 to image information and outputs it as an X-ray fluoroscopic image.

Figure 4:
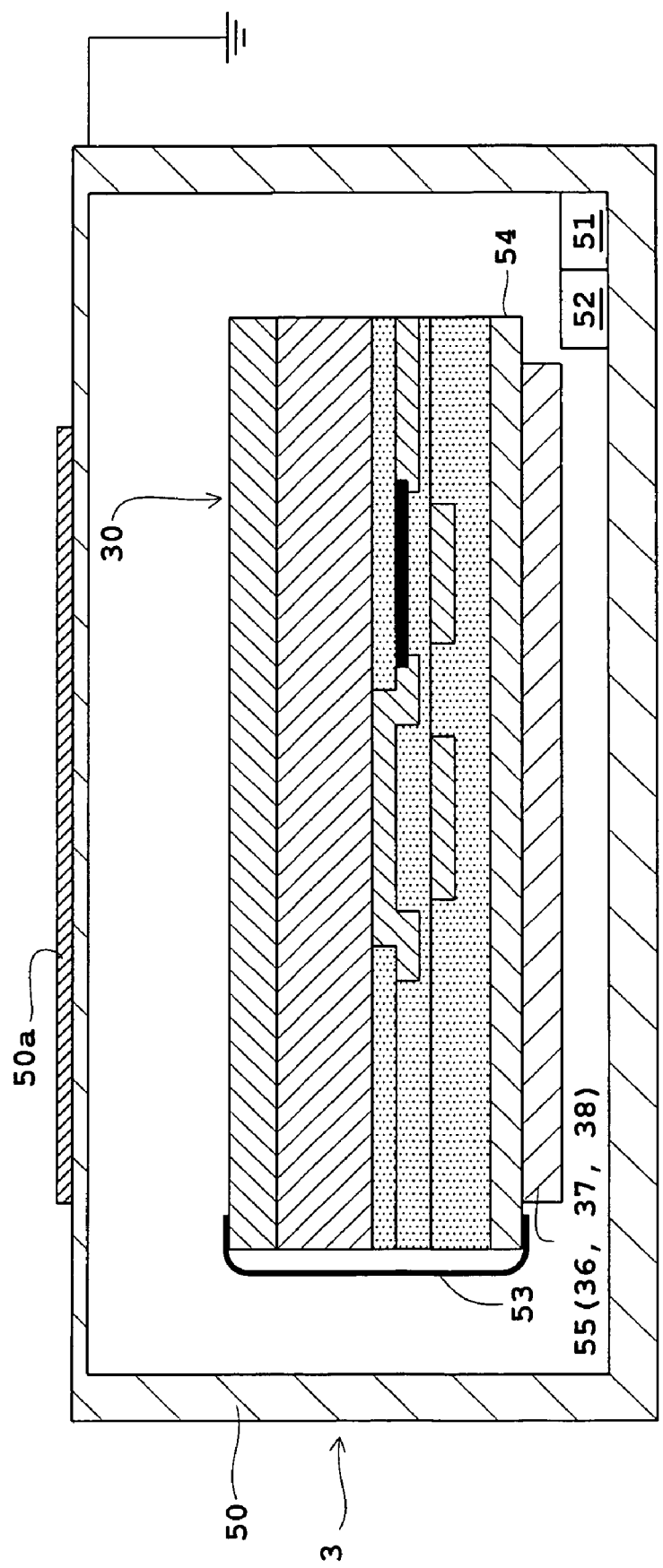
FIG. 4 is a schematic sectional view of an FPD unit including the flat panel X-ray detector according to the invention.

Next, a specific construction of the FPD unit 3 will be described with reference to FIG. 4. FIG. 4 is a schematic sectional view of the FPD unit 3 in the first embodiment. As shown in FIG. 4, the FPD unit 3 in the first embodiment, and also in the second to fourth embodiments described hereinafter, includes a case 50 having a shielding plate 50a attached thereto.

The case 50 including the shielding plate 50a, preferably, is formed of a resin having undergone an electric or magnetic shield process. More particularly, in the first embodiment, and also in the second to fourth embodiments described hereinafter, the body of the case 50 other than the shielding plate 50a is formed of a magnetically permeable material, typically an alloy of iron and nickel (Fe—Ni) which is a ferromagnetic material, baked (annealed) to about 1,000° C. (hereinafter called "permalloy"). The shielding plate 50a is disposed at the X-ray incidence side of the case 50 to shield off radiation and light other than the radiation to be detected (X-rays here). The shielding plate 50a is formed of a material of low shield factor such as a resin to minimize attenuation of X-rays due to the shielding plate 50a. The permalloy has conductivity also and, in the first embodiment, the permalloy is grounded. The relative permeability of the permalloy is dependent on flux density, and is about $10^4$ to several $10^6$. As noted above, the body of the case 50 formed of the permalloy is grounded, and the shielding plate 50a is disposed on the incidence surface of the case 50. Thus, the case 50 including the shielding plate 50a is formed of a resin having undergone an electric and magnetic shield process. The case 50 including the shielding plate 50a corresponds to the storage container in this invention.

Since X-rays can be attenuated by the permalloy, it is preferable to make the incidence side of the case 50 thinner than the other sides. In the first embodiment, the permalloy about 0.1 μm thick forms the incidence side, while the permalloy about 0.3 μm thick forms the other sides.

This case 50 stores a storage battery 51 in the form of a fuel cell and a memory 52 along with the FPD 30, amplifier array circuit 36, analog-to-digital converter 37 and gate driver circuit 38 described hereinbefore. More particularly, a flexible base 53 formed of an elastic material electrically connects the FPD 30 and a circuit board 54. The circuit board 54 has, mounted thereon, a circuit group 55 including the amplifier array circuit 36, analog-to-digital converter 37 and gate driver circuit 38. The FPD 30, storage battery 51, memory 52, flexible base 53, circuit board 54 and circuit group 55 (amplifier array circuit 36, analog-to-digital converter 37 and gate driver circuit 38) are placed in the case 50, with the storage battery 51 and memory 52 arranged in peripheral regions thereof. A gel resin (not shown) is poured and molded to fill gaps in the case 50 and fix the FPD 30 and others in place. The storage battery 51 corresponds to the storage battery in this invention. The memory 52 corresponds to the storage medium in this invention.

In the first embodiment, and also in the second to fourth embodiments described hereinafter, the storage battery 51 is charged once in order to supply power to the gate driver circuit 38 and memory 52 besides the amplifier array circuit 36 and analog-to-digital converter 37. The storage battery 51 may supply power only to the amplifier array circuit 36 and analog-to-digital converter 37, with a power source other than the storage battery 51, or a different storage battery, supplying power to the gate driver circuit 38 and memory 52. The storage battery 51 is not limited to the fuel cell noted above. The storage battery 51 may be in the form of a secondary battery (e.g. lead accumulator, nickel-cadmium battery, nickel-hydrogen battery, or rechargeable lithium-ion battery), the battery, preferably, repeating discharge and charge. Of course, the storage battery 51 may be a primary cell (e.g. dry cell) which only discharges without charging. The power source is not limited to any particular type, and the storage battery 51 may be a solar battery.

The memory 52 is in the form of a storage medium, as is the memory 10 shown in FIG. 1. The memory 52 is used to store the X-ray detection signals temporarily. The memory 52 may be a volatile memory, typically a DRAM (Dynamic Random-Access Memory), or a nonvolatile memory, typically an EPROM (Electrically Programmable Read-only Memory) or an $E^2$PROM (Electrically Erasable Programmable Read-only Memory). The memory 52 may be in the form of storage elements similar to the capacitors Ca in the FPD 30, to be incorporated into the FPD 30. The memory 52 in the form of a nonvolatile memory has an advantage that the data in the memory 52 is maintained even when the power ceases to be supplied from the storage battery 51.

The memory 10 shown in FIG. 1 may be incorporated into the memory 52 to be mounted in the case 50. Then, the image processor 8 shown in FIG. 1 may also be mounted in the case 50. In this case, the data stored in the memory 52 is not limited to the X-ray detection signals, but is the data and image information processed by the image processor 8. Thus, the data stored in the memory 52 is not limited to particular data, but may be any data resulting from a detecting operation.

Next, a method of manufacturing the FPD 30 will be described with reference to FIGS. 5A-5F. FIGS. 5A-5F are schematic sectional views showing steps of manufacturing the FPD 30 in the first embodiment.

Figure 5A:
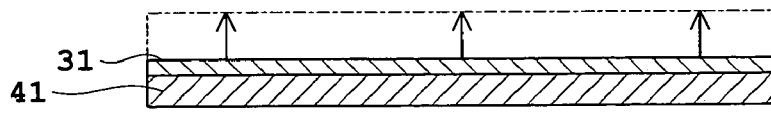
FIG. 5A is a schematic sectional view showing a flat panel X-ray detector manufacturing step in a first embodiment of the invention.

First, as shown in FIG. 5A, the semiconductor thick film 31 is formed by vapor deposition on a conductive substrate 41 formed of graphite. The semiconductor for forming the semiconductor thick film 31 may be selected appropriately according to use, withstand voltage and so on, for example, from among CdTe, CdZnTe, PbI2, PbO, amorphous semiconductors such as amorphous selenium noted hereinbefore, and polycrystalline semiconductors.

In the first embodiment, and also in the third embodiment described hereinafter, since the readout pattern is not destroyed for the reason described hereinafter, the conversion layer, typically the semiconductor thick film 31, may be formed with no restriction as to temperature, thereby increasing the freedom for selecting the conversion layer. It is therefore possible to use a conversion layer formed of single crystal as the semiconductor thick film 31.

In FIGS. 5A-5F, the lower surface is the X-ray incidence surface, and the upper surface the reverse surface to the incidence surface. After forming the semiconductor thick film 31, as shown in FIGS. 5B-5F, the carrier collecting electrodes 33, capacitors Ca and thin-film transistors Tr are laminated as the readout pattern on the upper surface, i.e. the reverse surface to the incidence surface, of the semiconductor thick film 31. This process will particularly be described hereinafter.

Figure 5B:
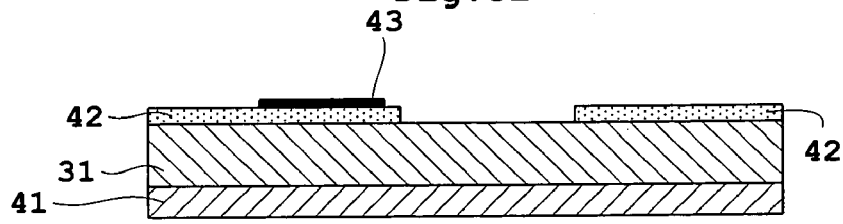
FIG. 5B is a schematic sectional view showing a flat panel X-ray detector manufacturing step in the first embodiment.
Figure 5C:
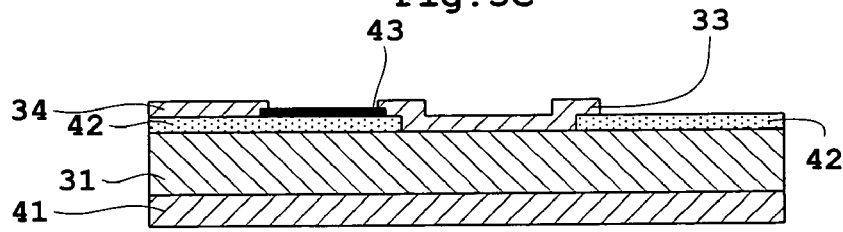
FIG. 5C is a schematic sectional view showing a flat panel X-ray detector manufacturing step in the first embodiment.

As shown in FIG. 5B, an insulating layer 42 is laminated on the upper surface of the semiconductor thick film 31. Gate channels 43 formed of pentacene are laminated on the upper surface of the insulating layer 42. As shown in FIG. 5C, the carrier collecting electrodes 33 are laminated on the upper surfaces at ends of the gate channels 43, and the data lines 34 on the upper surfaces at the other ends of the gate channels 43.

Figure 5D:
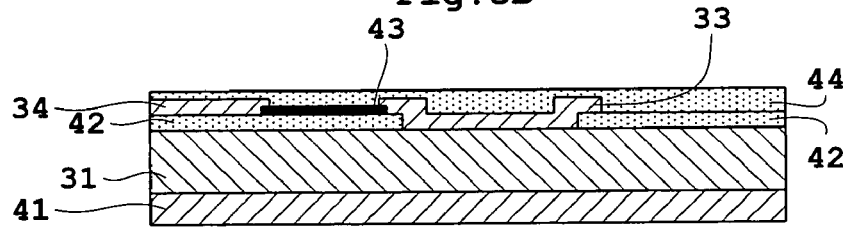
FIG. 5D is a schematic sectional view showing a flat panel X-ray detector manufacturing step in the first embodiment.
Figure 5E:
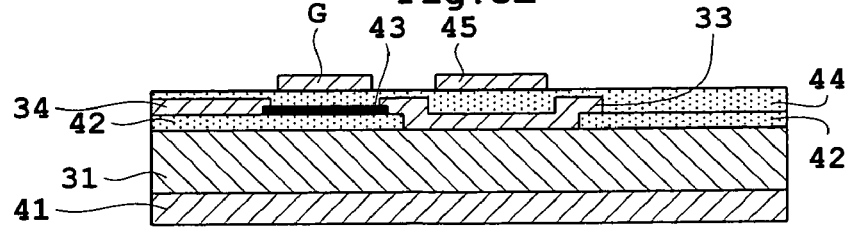
FIG. 5E is a schematic sectional view showing a flat panel X-ray detector manufacturing step in the first embodiment.

As shown in FIG. 5D, an insulating layer 44 is laminated on the upper surfaces of the insulating layer 42, gate channels 43, carrier collecting electrodes 33 and data lines 34. As shown in FIG. 5E, gates G and storage capacitance counterelectrodes 45 are laminated on the upper surface of the insulating layer 44. The storage capacitance counterelectrodes 45 are grounded. The gates G and gate lines 35 (see FIGS. 2 and 3) are electrically connected through wiring and VIA not shown.

Figure 5F:
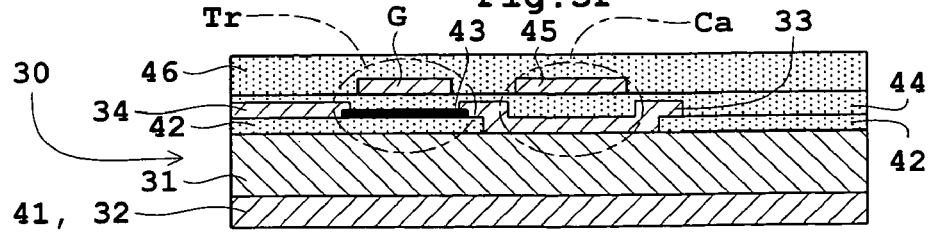
FIG. 5F is a schematic sectional view showing a flat panel X-ray detector manufacturing step in the first embodiment.

As shown in FIG. 5F, an insulating layer 46 is laminated on the upper surfaces of the insulating layer 44, gates G and storage capacitance counterelectrodes 45. Where the lower surface in these figures is the X-ray incidence surface, the structure may be turned upside down to become what is shown in FIGS. 2 and 4 (FIG. 2 being an equivalent circuit). Therefore, as shown in FIG. 5F, the conductive substrate 41 serves as the voltage application electrode 32. Each thin-film transistor Tr is formed of an end adjacent a gate channel 43 of a carrier collecting electrode 33, an end of a gate channel 43 of a data line 34, a gate channel 43, a gate G and the insulating layer 44. Each capacitor Ca is formed of a carrier collecting electrode 33, the insulating layer 44, and a storage capacitance counterelectrode 45. The laminating formation of these carrier collecting electrodes 33, capacitors Ca, thin-film transistors Tr, data lines 34 and gate lines 35 corresponds to the readout pattern forming step in this invention.

Regarding the laminating formation of the readout pattern, the entire readout pattern may be formed of organic thin film, or at least part of the readout pattern may be formed of organic thin film. Specific examples of the laminating formation of the readout pattern with organic thin film are as follows.

For example, at least part of the carrier collecting electrodes 33, capacitors Ca and thin-film transistors Tr may be formed of organic thin film, and so may be at least part of the data lines 34 and gate lines 35. When forming the data lines 34 and gate lines 35 with organic thin film, a conductive organic material is used. At least part of the carrier collecting electrodes 33, capacitors Ca and thin-film transistors Tr may be formed of organic thin film, and at least part of the data lines 34 and gate lines 35 may be formed of inorganic thin film (e.g., clear electrode such as ITO) or metal.

The organic thin film includes organic low molecules, typically single crystals such as pentacene and naphthacene (the gate channels 43 being formed of pentacene in the first embodiment) and organic polymers. A specific laminating formation method is varied according to which is selected. When an organic low molecule is selected for the readout pattern, the laminating formation is performed by vapor deposition. When an organic polymer is selected for the readout pattern, the laminating formation is performed by printing (ink jet method, or a kind of stamping or coating method).

When an organic polymer is selected, the conductive parts of the carrier collecting electrodes 33, capacitors Ca and thin-film transistors Tr (e.g. the storage capacitance counter-electrodes 45 of the carrier collecting electrode 33 and capacitors Ca, and the gates G of the thin-film transistors Tr) are formed of a conductive organic material, typically PEDOT (polythiophenic) or PPV (polyphenylene vinylene). The insulating layers 42, 44 and 46 are formed of polyimide or polyvinyl phenol.

Even when at least part of the data lines 34 and gate lines 35 are formed of inorganic thin film or metal instead of organic thin film, it is possible to perform laminating formation by printing (ink jet method, or a kind of stamping or coating method). In this case, it is preferable to reduce a material that does not oxidize easily (e.g. a noble metal such as silver, gold or platinum) to particles of nano size (about $10^{-9}$ mm), and form the data lines 34 and gate lines 35 by printing. Wiring such as the data lines 34 and gate lines 35 may be formed by using a pattern technique (e.g. sputtering) by photolithographic method instead of vapor deposition or printing noted above.

When forming part of the carrier collecting electrodes 33, capacitors Ca and thin-film transistors Tr with inorganic thin film (e.g. amorphous silicon) instead of organic thin film, the laminating formation may be carried out by using a pattern technique (e.g. sputtering) by photolithographic method instead of vapor deposition or printing, as noted in relation to the data lines 34 and gate lines 35.

Besides the FPD 30 manufactured in this way, the circuit group 55 including the amplifier array circuit 36, analog-to-digital converter 37 and gate driver circuit 38 is mounted on the circuit board 54. The FPD 30 and circuit board 54 are electrically connected by the flexible base 53. The storage battery 51 and memory 52 are arranged peripherally of the FPD 30. These components are placed in the case 50. Before or after the storage, the case 50 formed of the permalloy is grounded, and the shielding plate 50a formed of resin is attached to the case 50. Thus, an electric and magnetic shield process is performed for the shielding plate 50a formed of resin. This shield process corresponds to the shielding step in this invention.

According to the method of manufacturing the FPD unit 3 having the flat panel X-ray detector (FPD) 30 in the first embodiment described above, as shown in FIGS. 5B-5F, at least part of the readout pattern including the carrier collecting electrodes 33, capacitors Ca, thin-film transistors Tr, data lines 34 and gate lines 35 is formed by vapor deposition or printing. This readout pattern is formed separately from the semiconductor thick film 31. The FPD 30 having the semiconductor thick film 31 and the readout pattern is contained in the case 50 to form a unit. The weight is reduced by using the semiconductor thick film 31 in place of the conventional glass substrate. The FPD 30 manufactured in this way is free from great restrictions in time of transport and use.

The weight reduction realizes the FPD unit 3 of the portable type capable of being carried about conveniently. The FPD unit 3 can be used outdoors such as at a disaster site, for example. Since no great restrictions are imposed in time of transport or use, there is little chance of damage, for example, by shocks occurring during transport and use, unlike the case of the conventional glass substrate. Thus, the FPD unit 3 has also an advantage of being strong against shocks.

In the first embodiment, and also in the third embodiment described hereinafter, when laminating the readout pattern in the process shown in FIGS. 5B-5F, since the semiconductor thick film 31 has already been formed, the readout pattern may be laminated without depending on the temperature used in time of forming the semiconductor thick film 31. As a result, the FPD 30 can be manufactured easily without destroying the readout pattern. The conversion layer, typically the semiconductor thick film 31, may be formed with no restriction as to temperature. This increases the freedom for selecting the conversion layer, e.g. the conversion layer formed of single crystal can be selected, and also provides for an increased area.

When at least part of the readout pattern is formed with organic thin film, the organic low molecules, typically single crystals such as pentacene and naphthacene, are suited for forming the readout pattern by vapor deposition. The organic polymers are suited for forming the readout pattern by printing (ink jet method, or a kind of stamping or coating method). Therefore, it is preferred to form the readout pattern with an organic low molecule in the case of vapor deposition. It is preferred to form the readout pattern with an organic polymer in the case of printing (ink jet method, or a kind of stamping or coating method). It is also possible in the case of printing to form part of the readout pattern (e.g. wiring such as the data lines 34 and gate lines 35) with inorganic thin film or metal instead of organic thin film.

In the first embodiment, the electric and magnetic shield process is performed for the shielding plate 50a formed of resin. This provides the effect of excluding noise caused by electricity and magnetism.

In the first embodiment, the case 50 contains the amplifier array circuit 36 and analog-to-digital converter 37 besides the FPD 30. Thus, the FPD 30 can be joined with the amplifier array circuit 36 and analog-to-digital converter 37 to form a unit. Further, the case 50 contains the storage battery 51 along with the amplifier array circuit 36 and analog-to-digital converter 37. There is no need for an electrically connected power cable in order to supply power. This eliminates the trouble such as the cable being caught on a foot, thus providing for convenience in management. The storage battery 50 in the form of a fuel cell can be used for a long time. In the first embodiment, the FPD 30 can be integrated into a unit with the memory 52 also stored in the case 50.

With the X-ray fluoroscopic apparatus using this FPD 30, the image processor 8 can smoothly carry out a series of imaging processes.

Second Embodiment

Next, the second embodiment of this invention will be described with reference to the drawings.

Figure 6:
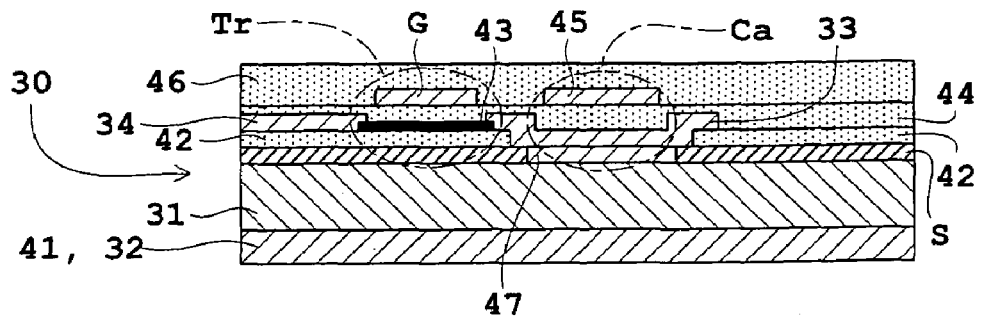
FIG. 6 is a schematic sectional view of a flat panel X-ray detector in a second embodiment.
Figure 7A:
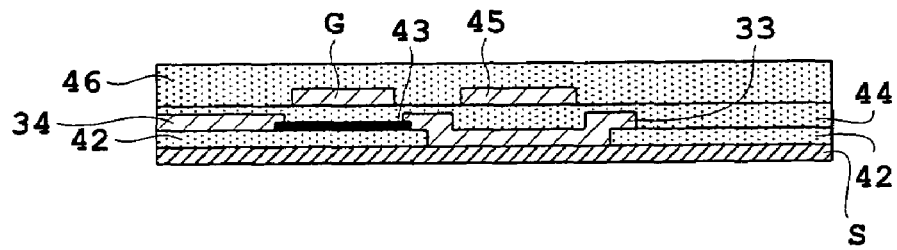
FIG. 7A is a schematic sectional view showing a flat panel X-ray detector manufacturing step in the second embodiment.
Figure 7B:
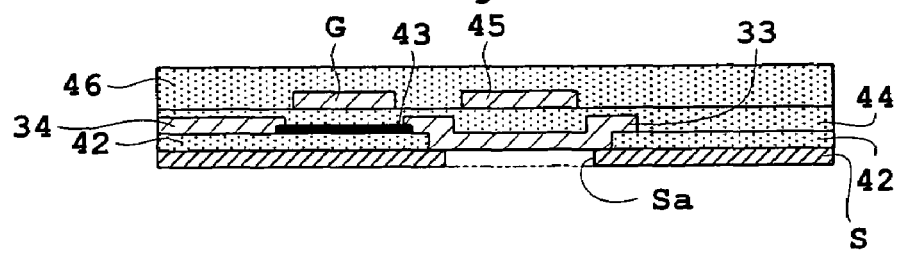
FIG. 7B is a schematic sectional view showing a flat panel X-ray detector manufacturing step in the second embodiment.
Figure 7C:
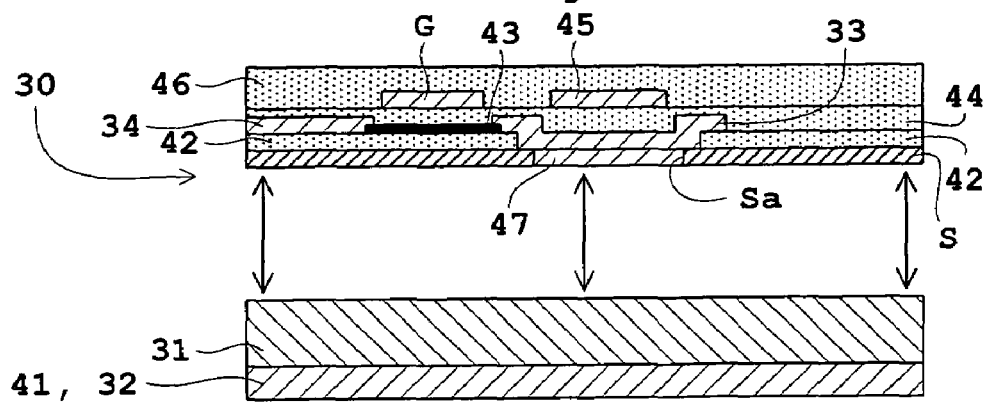
FIG. 7C is a schematic sectional view showing a flat panel X-ray detector manufacturing step in the second embodiment.

FIG. 6 is a schematic sectional view of an FPD 30 in the second embodiment. FIGS. 7A-7C are schematic sectional views showing steps of manufacturing the FPD 30 in the second embodiment. Like reference signs and numerals are used to identify like parts which are the same as in the first embodiment and will not be described again. The X-ray fluoroscopic apparatus has the same construction as shown FIG. 1.

In the first embodiment described hereinbefore, the readout pattern including the carrier collecting electrodes 33, capacitors Ca, thin-film transistors Tr, data lines 34 and gate lines 35 is laminated directly on the semiconductor thick film 31. In the second embodiment, as shown in FIG. 6, a thin film sheet S is interposed between the readout pattern and semiconductor thick film 31. Thus, in the second embodiment, the FPD 30 is manufactured as shown in FIGS. 7A-7C. The thin film sheet S is formed of a resin material. Preferably, the thin film sheet S is plastic like a synthetic resin. The plastic thin film sheet S, even when subjected to a force of pasting described hereinafter, is freely deformable under the force, thereby improving adhesion in time of pasting. The thin film sheet S corresponds to the thin film sheet in this invention.

First, as shown in FIG. 7A, at least part of the readout pattern is formed on the thin film sheet S by vapor deposition or printing. The laminating formation of this readout pattern is the same as the process in the first embodiment shown in FIGS. 5B-5F, and will not be described again. The first embodiment described hereinbefore may be applied regarding the material and laminating formation method for forming the readout pattern. The readout pattern formed on the thin film sheet S and the semiconductor thick film 31 are pasted together. As shown in FIG. 7C, this pasting operation is carried out so that the thin film sheet S may be in direct contact with the semiconductor thick film 31. As a result of this pasting, the thin film sheet S is interposed between the readout pattern and semiconductor thick film 31. This pasting operation corresponds to the pasting step in this invention.

It is preferable to process the thin film sheet S as shown in FIGS. 7B and 7C, before the pasting operation. That is, the thin film sheet S can be obstructive when the carrier collecting electrodes 33 collect carriers. Thus, as shown in FIG. 7B, the thin film sheet S is perforated to form through-holes Sa directly under the respective carrier collecting electrodes 33. When pasted, the carrier collecting electrodes 33 are in direct contact with the semiconductor thick film 31. Since there is a possibility that gaps can be formed by the through-holes Sa in time of pasting, conductive paste 47 may be poured in to fill the through-holes Sa as shown in FIG. 7C.

The method of manufacturing an FPD unit 3 having the flat panel X-ray detector (FPD) 30 in the second embodiment described above realizes an FPD unit 3 with the thin film sheet S interposed between the readout pattern and semiconductor thick film 31.

Third Embodiment

Next, the third embodiment of this invention will be described with reference to the drawings.

Figure 8A:
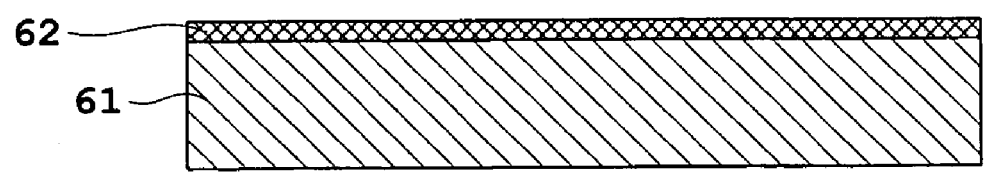
FIG. 8A is a schematic sectional view showing a flat panel X-ray detector manufacturing step in a third embodiment.
Figure 8B:
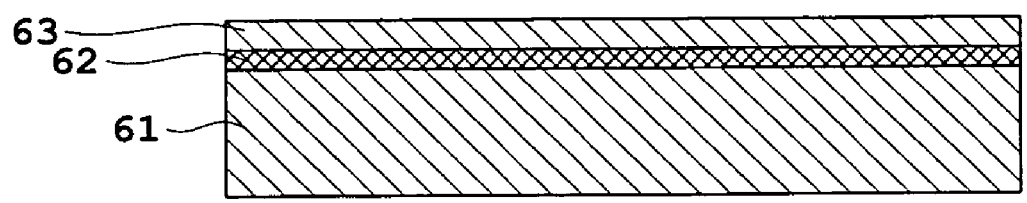
FIG. 8B is a schematic sectional view showing a flat panel X-ray detector manufacturing step in the third embodiment.
Figure 8C:
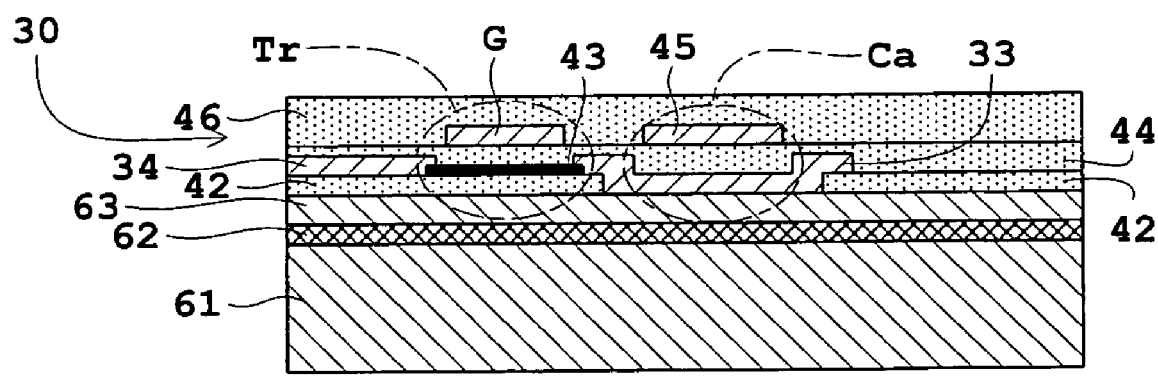
FIG. 8C is a schematic sectional view showing a flat panel X-ray detector manufacturing step in the third embodiment.

FIGS. 8A-8C are schematic sectional views showing steps of manufacturing an FPD 30 in the third embodiment. Like reference signs and numerals are used to identify like parts which are the same as in the first and second embodiments and will not be described again. The X-ray fluoroscopic apparatus has the same construction as shown FIG. 1.

In the first and second embodiments described hereinbefore, this invention is applied to a "direct conversion type" radiation detector in which the semiconductor thick film 31 (conversion layer) converts incident radiation (e.g. X-rays in the first embodiment) directly to charge information. The invention is applicable also to an "indirect conversion type" radiation detector having a first conversion layer such as a scintillator for converting incident radiation to light, and a second conversion layer formed of a light-sensitive material (e.g. photodiode) for converting the light to charge information. The third embodiment concerns a method of manufacturing a flat panel X-ray detector (FPD) 30 of the "indirect conversion type". The method of manufacturing the flat panel X-ray detector (FPD) 30 in the third embodiment will be described with reference to FIGS. 8A-8C.

First, as shown in FIG. 8A, a clear electrode 62, typically ITO, is laminated on a scintillator 61 by vapor deposition. The conversion layer which forms the scintillator 61 may be selected as appropriate from CsI, $Cd_2O_2S$ and so on. The clear electrode 62 is an electrode for impressing bias voltage $V_A$, as is the voltage application electrode 32 in the first and second embodiments (FIG. 2). The scintillator 61 corresponds to the first conversion layer in this invention.

As shown in FIG. 8B, a light-sensitive semiconductor thick film 63 is laminated on the upper surface of the clear electrode 62 by vapor deposition. The light-sensitive semiconductor thick film 63 may be selected as appropriate from amorphous selenium, amorphous silicon, single crystal Si and so on. The light-sensitive semiconductor thick film 63 corresponds to the second conversion layer in this invention.

As shown in FIG. 8C, the readout pattern is laminated on the upper surface of the semiconductor thick film 63. The laminating formation of this readout pattern is the same as the process in the first embodiment shown in FIGS. 5B-5F, and will not be described again. The first embodiment described hereinbefore may be applied regarding the material and laminating formation method for forming the readout pattern.

The semiconductor thick film 63 may be laminated over the entire surface, or may be formed as divided for each detecting element DU. Where the semiconductor thick film 63 is a photodiode, the photodiode may have a PIN structure. Where the photodiode has a large parasitic capacitance, the storing elements, typically the capacitors Ca, are not necessarily required.

In the third embodiment, the scintillator 61 converts incident X-rays to light, and the light-sensitive semiconductor thick film 63 converts the light to carriers serving as charge information. The FPD 30 detects X-rays, with the scintillator 61 and semiconductor thick film 63 converting X-rays indirectly to carriers.

Fourth Embodiment

Next, the fourth embodiment of this invention will be described with reference to the drawings.

Figure 9:
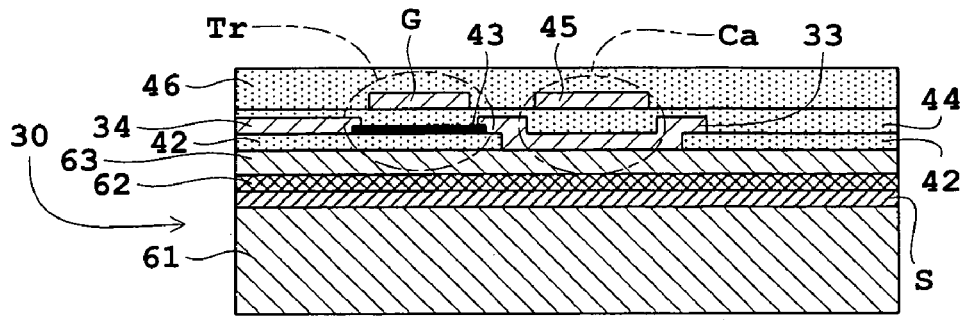
FIG. 9 is a schematic sectional view of a flat panel X-ray detector in a fourth embodiment.
Figure 10A:
FIG. 10A is a schematic sectional view showing a flat panel X-ray detector manufacturing step in the fourth embodiment.
Figure 10B:
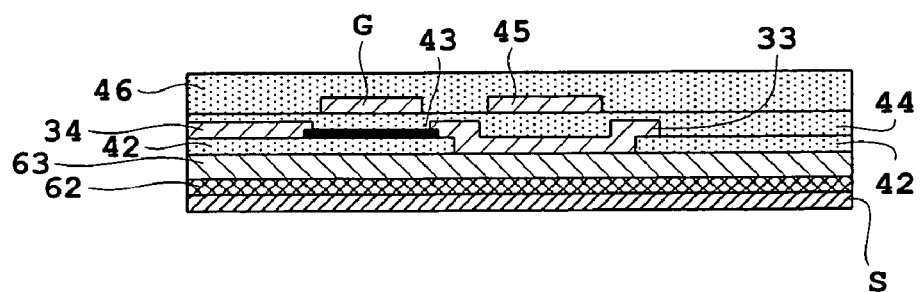
FIG. 10B is a schematic sectional view showing a flat panel X-ray detector manufacturing step in the fourth embodiment.
Figure 10C:
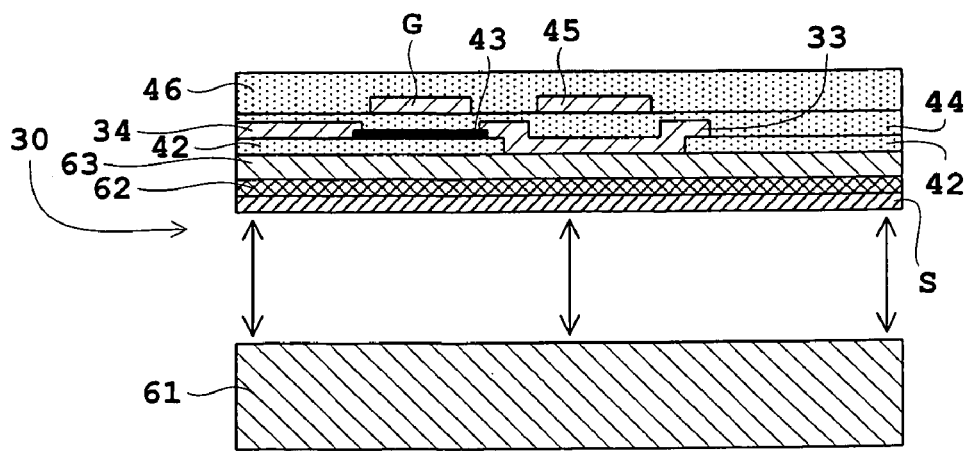
FIG. 10C is a schematic sectional view showing a flat panel X-ray detector manufacturing step in the fourth embodiment.

FIG. 9 is a schematic sectional view of an FPD 30 in the fourth embodiment. FIGS. 10A-10C are schematic sectional views showing steps of manufacturing the FPD 30 in the fourth embodiment. Like reference signs and numerals are used to identify like parts which are the same as in the first to third embodiments and will not be described again. The X-ray fluoroscopic apparatus has the same construction as shown FIG. 1.

In the third embodiment described above, the light-sensitive semiconductor thick film 63 is laminated directly on the clear electrode 62 laminated on the scintillator 61. In the fourth embodiment, as shown in FIG. 9, a thin film sheet S is interposed between the light-sensitive semiconductor thick film 63/clear electrode 62, and the scintillator 61. As a result, the thin film sheet S is interposed between the readout pattern and the scintillator 61. Thus, in the fourth embodiment, the FPD 30 is manufactured as shown in FIGS. 10A-10C. The material and effect of the thin film sheet S are the same as in the second embodiment. That is, the fourth embodiment is a combination of the thin film sheet S in the second embodiment and the flat panel X-ray detector (FPD) 30 of the "indirect conversion type" in the third embodiment.

First, as shown in FIG. 10A, the clear electrode 62 is laminated by vapor deposition on the thin film sheet S, and the light-sensitive semiconductor thick film 63 is laminated by vapor deposition on the upper surface of the clear electrode 62. After forming the semiconductor thick film 63, as shown in FIG. 10B, at least part of the readout pattern is formed by vapor deposition or printing. The laminating formation of this readout pattern is the same as the process in the first embodiment shown in FIGS. 5B-5F, and will not be described again.

The first embodiment described hereinbefore may be applied regarding the material and laminating formation method for forming the readout pattern.

The readout pattern formed on thin film sheet S along with the clear electrode 62 and light-sensitive semiconductor thick film 63 and the scintillator 61 are pasted together. As shown in FIG. 10C, this pasting operation is carried out so that the thin film sheet S may be in direct contact with the scintillator 61. As a result of this pasting, the thin film sheet S is interposed between the light-sensitive semiconductor thick film 63/clear electrode 62, and the scintillator 61. Thus, the thin film sheet S is interposed between the readout pattern and the scintillator 61. This pasting operation corresponds to the pasting step in this invention.

The method of manufacturing an FPD unit 3 having the flat panel X-ray detector (FPD) 30 in the fourth embodiment described above realizes an FPD unit 3 with the thin film sheet S interposed between the readout pattern and scintillator 61.

This invention is not limited to the foregoing embodiments, but may be modified as follows:

(1) In each embodiment described above, the fluoroscopic apparatus shown in FIG. 1 has been described by way of example. This invention may be applied also to a fluoroscopic apparatus mounted on a C-shaped arm, for example. This invention may be applied also to an X-ray CT apparatus.

(2) In each embodiment described above, the X-ray detector for detecting X-rays has been described by way of example. This invention is not limited to a particular type of radiation detector which may, for example, be a gamma-ray detector for detecting gamma rays emitted from a patient dosed with radioisotope (RI), such as in an ECT (Emission Computed Tomography) apparatus. Similarly, this invention is applicable to any imaging apparatus that detects radiation, as exemplified by the ECT apparatus noted above.

(3) In each embodiment described above, the radiation detector for detecting radiation, typically X-rays, has been described by way of example. This invention is applicable also to a photo detector for detecting light. Thus, the invention is not limited to any device that forms images by detecting light. In this case, the scintillator (first conversion layer) as in the third and fourth embodiments is not provided, but the semiconductor layer (second conversion layer) formed of a light-sensitive material as in the third and fourth embodiments is provided. The detector detects light by reading charge information converted from light by the semiconductor layer.

Figure 11A:
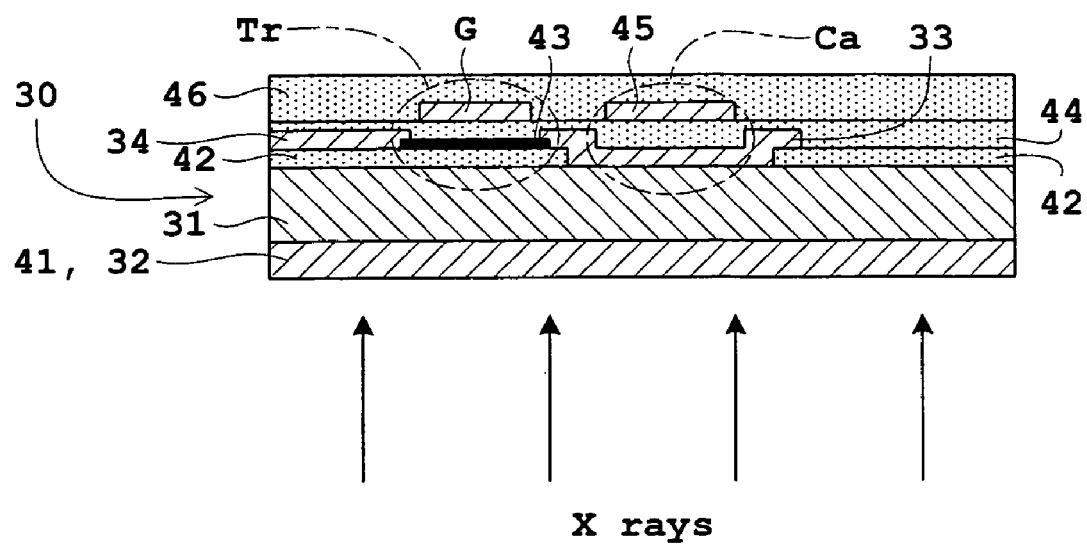
FIG. 11A is a schematic sectional view of a flat panel X-ray detector having an incidence surface.
Figure 11B:
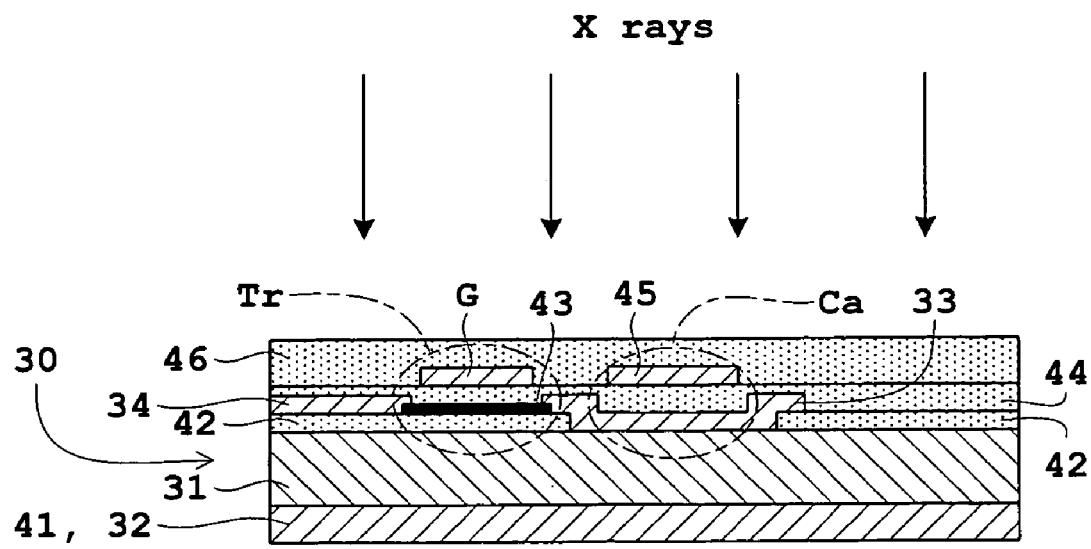
FIG. 11B is a schematic sectional view of a flat panel X-ray detector having a different incidence surface.

(4) In each embodiment described above, the readout pattern is laminated on the reverse surface to the surface of incidence of radiation, typically light or X-rays (see FIGS. 5F, 6, 8C, 9 and 11A). Instead, as shown in FIG. 11B, the readout pattern may be laminated on the incidence surface.

(5) Where the carrier collecting electrodes 33 described above cannot collect enough carriers due to the capacity of capacitors Ca, storing elements (e.g. about 0.1-10 pF being optimal) may be arranged besides the capacitors Ca. Whenever the carrier collecting electrodes 33 collect carriers, the carriers are once stored in the capacitors Ca with the small capacity, and are then collected in the separate storing elements. The electrodes of the storing elements may also be formed of organic thin film or inorganic thin film.

(6) In each embodiment described above, at least part of the readout pattern is formed by vapor deposition or printing. Instead, the readout pattern may be formed by combination of the pattern technique (e.g. sputtering) by photolithography method, and vapor deposition or printing. For example, part of the readout pattern is formed by vapor deposition or printing, and the remaining part of the readout pattern by using the pattern technique by photolithography method. As a pattern technique other than vapor deposition and printing, a sol-gel method for forming patterns by immersion in liquid phase may be used instead of sputtering noted above.

(7) In each embodiment described above, the storage container represented by the case 50 including the shielding plate 50a contains the storage battery 51 in the form of a fuel cell and the memory unit 52, as well as the FPD 30, amplifier array circuit 36, analog-to-digital converter 37 and gate driver circuit 38. As long as at least the FPD 30 is contained, the other components may be arranged outside the storage container and connected by electric cables for data transfer as noted in the first embodiment. Similarly, the storage battery 51 may be contained as in each embodiment, or detachably attached to the storage container. With the storage battery 51 detachably attached to the storage container, a selection may be made as appropriate between a detecting unit with the storage battery and a detecting unit without the storage battery.

(8) In each embodiment described above, the case 50 including the shielding plate 50a is subjected to an electric and magnetic shield process. Where mixing of noise due to electricity or magnetism need not be considered, there is no need for the shield process. A shield process may be performed regarding electricity or magnetism. A magnetically permeable substance, typically permalloy, has conductivity. The permalloy is grounded to prevent mixing of noise due to electricity. Where mixing of noise due to electricity need not be considered, for example, the magnetically permeable material need not be conductive. An iron core of a coil, for example, is a magnetically permeable substance but does not have conductivity. Such an iron core may be formed as a magnetic shield. Further, an electric shield may be formed by grounding a substance having conductivity without being magnetically permeable.

(9) Electric cables as in the first embodiment described above may be detachably attached to the storage container represented by the case 50 including the shielding plate 50a. Then, the detecting unit can be used also as the stationary type.

This invention may be embodied in other specific forms without departing from the spirit or essential attributes thereof and, accordingly, reference should be made to the appended claims, rather than to the foregoing specification, as indicating the scope of the invention.

What is claimed is:

1. A method of manufacturing a light or radiation detecting unit including a light or radiation detector having a conversion layer for receiving light or radiation and conveying information on said light or radiation into charge information, and a readout pattern for reading the charge information, the light or radiation detector detecting the light or radiation by reading the charge information with said readout pattern, and being mounted in a storage container to form a unit, said method comprising:

a readout pattern forming step for forming at least part of said readout pattern by vapor deposition or printing on a thin film sheet; and a pasting step for pasting the readout pattern formed on said thin film sheet and said conversion layer;

wherein said readout pattern is formed in said readout pattern forming step separately from said conversion layer, and wherein said thin film sheet is interposed between said readout pattern and said conversion layer.

2. A method of manufacturing a light or radiation detecting unit as defined in claim 1, wherein said conversion layer includes a first conversion layer for conveying information on incident radiation to information on said light, and a second conversion layer for conveying the information of said light to said charge information, said detector detecting the radiation with the first conversion layer and the second conversion layer.

3. A method of manufacturing a light or radiation detecting unit as defined in claim 2:
   wherein said readout pattern forming step is executed to form at least part of said readout pattern along with said second conversion layer by vapor deposition or printing on a thin film sheet;
   said method further comprising a pasting step for pasting the readout pattern formed along with said second conversion layer on said thin film sheet and said first conversion layer.

4. A method of manufacturing a light or radiation detecting unit as defined in claim 1, wherein said readout pattern forming step is executed to form at least part of said readout pattern with an organic thin film.

5. A method of manufacturing a light or radiation detecting unit as defined in claim 4, wherein, when an organic low molecule is selected for said readout pattern, said readout pattern is laminated by vapor deposition.

6. A method of manufacturing a light or radiation detecting unit as defined in claim 4, wherein, when an Organic polymer is selected for said readout pattern, said readout pattern is laminated by printing.

7. A method of manufacturing a light or radiation detecting unit as defined in claim 1, wherein wiring of said readout pattern is laminated by printing of a noble metal reduced to particles of nano size.

8. A method of manufacturing a light or radiation detecting unit as defined in claim 1, wherein said readout pattern is laminated on a reverse surface to a radiation incidence surface of said conversion layer.

9. A method of manufacturing a light or radiation detecting unit as defined in claim 1, wherein said readout pattern is laminated on a radiation incidence surface of said conversion layer.

10. A method of manufacturing a light or radiation detecting unit as defined in claim 1:
    wherein said storage container is formed of a resin;
    said method further comprising a shield processing step for performing an electric or magnetic shield process of said resin.

11. A method of manufacturing a light or radiation detecting unit as defined in claim 10, wherein said storage container has an incidence surface formed thinner than other surfaces thereof.

12. A method of manufacturing a light or radiation detecting unit as defined in claim 1, wherein said method further comprises forming said readout pattern on said conversion layer.

* * * * *